Sept. 25, 1956  J. R. AUSTIN, SR  2,764,303
PISTON ROD GUARD FOR MATERIAL HANDLING APPARATUS
Filed July 1, 1954  2 Sheets-Sheet 1
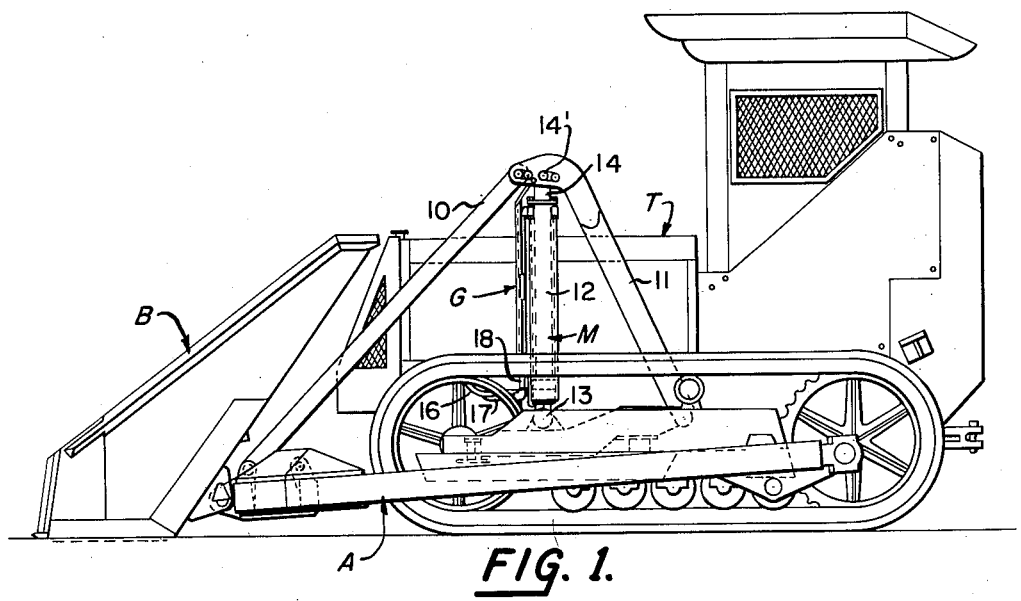
FIG. 1.
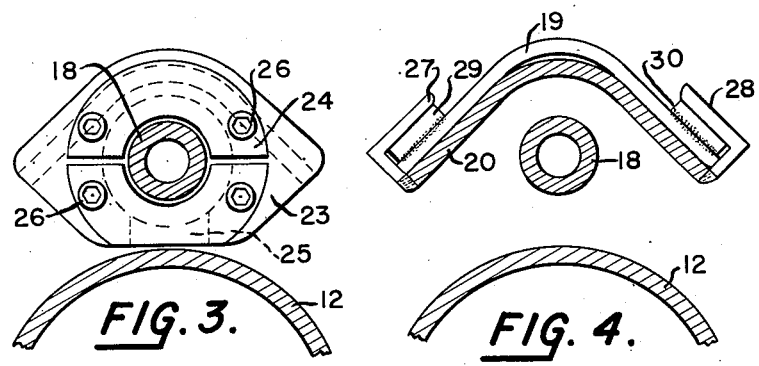
FIG. 3.   FIG. 4.
FIG. 5.
INVENTOR.

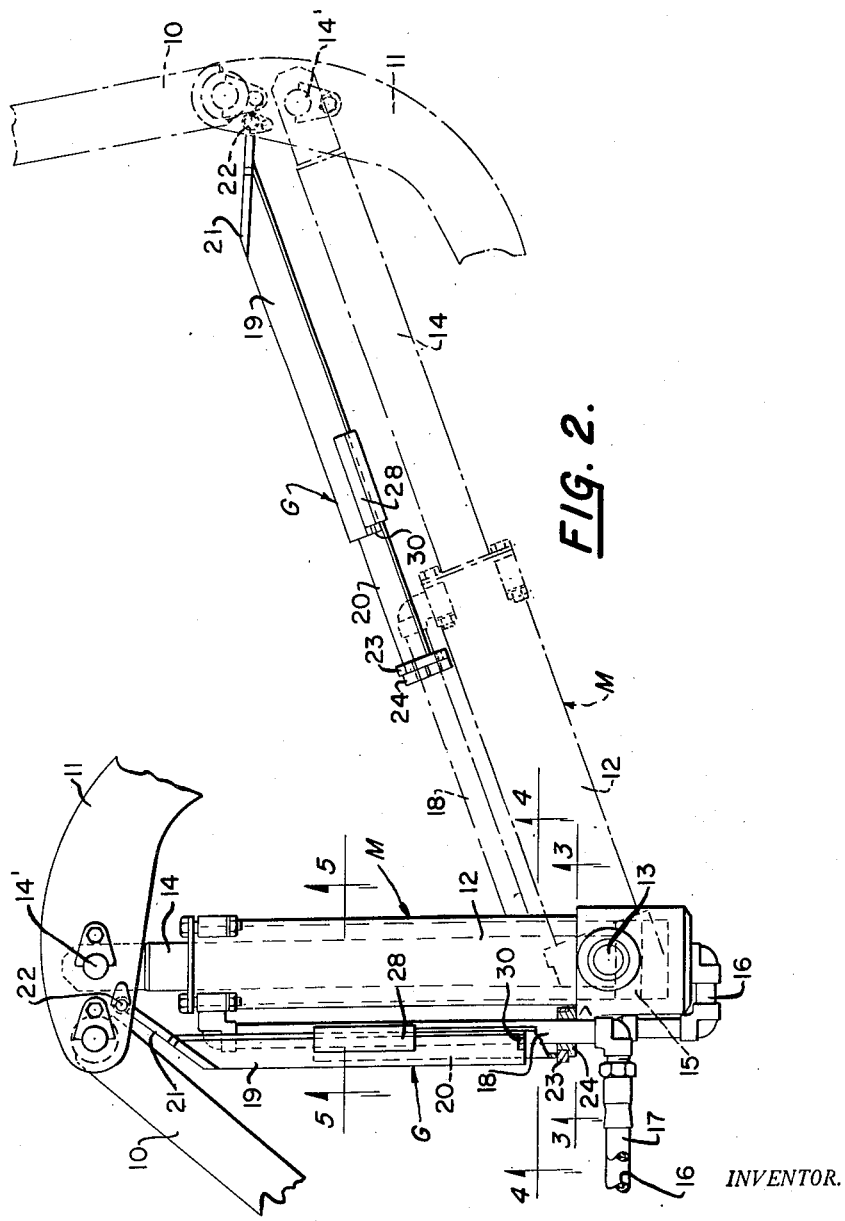

United States Patent Office 2,764,303
Patented Sept. 25, 1956

2,764,303

PISTON ROD GUARD FOR MATERIAL HANDLING APPARATUS

John R. Austin, Sr., Denver, Colo.

Application July 1, 1954, Serial No. 440,643

9 Claims. (Cl. 214—131)

This invention relates to the protecting of piston rods of fluid operated motors and more particularly the piston rods of hydraulically operated motors employed in material handling apparatus where material being handled may fall onto the piston rods and cause damage thereto.

One of the objects of my invention is to provide an improved protecting device in the form of a guard to prevent damaging substances from falling on the piston rod of a fluid operating motor as the piston rod becomes exposed outside of the motor during the operation of the motor.

Another object is to produce a guard of the type above referred to which is made of cooperating parts which will have relative movement and become extensible as the piston moves and assumes an exposed position outside the motor.

Still another object is to produce a guard for a piston rod of a piston and cylinder motor that will be mounted on the motor for extensible movement as the piston rod becomes exposed during motor operation so as to continue to cover and protect the rod from undesirable foreign material.

A further object is to provide a guard for a fluid motor piston rod that will be extensible and so mounted on the motor as to be extensible by movement of the piston rod and at the same time be capable of relative movement on the cylinder or equivalent member as the piston rod moves relatively thereto.

A still further and more specific object is to produce a protecting guard for the piston rod of an hydraulic actuating motor of an overshot material loader which motor is of the double acting type and the guard is mounted on a pipe connection to the motor for extensible movement as the piston rod becomes exposed during operation of the motor.

Other objects of my invention will become apparent from the following description taken in connection with the accompanying drawings in which:

Figure 1 is a side view of an overshot loader which is hydraulically operated by a piston and cylinder motor with which is associated my improved protective guard for the piston rod to prevent damaging material handled by the loader from falling on the rod when it is exposed outside the cylinder;

Figure 2 is an enlarged view of the motor and the guard for the piston rod thereof, said view showing in full lines the condition of the guard when the loader bucket is in loading position and the condition of the guard when the loader bucket is in dumping position with the dumping position of certain structure being shown in dashed lines; and Figures 3, 4 and 5 are section views showing details of the guard, said views being taken on the respective lines 3—3, 4—4 and 5—5 of Figure 2.

I have primarily designed my piston rod guard for a piston and cylinder actuating structure for an overshot loader, but it is to be understood that it is not limited to such an actuating structure being so used as the guard can be employed wherever a piston rod needs to be protected from foreign material or otherwise guarded as it moves to different exposed positions outside the cylinder in which the piston moves.

As shown, the overshot loader is mounted on a tractor T which may be of any suitable type as the track laying type illustrated or one of the wheeled type. This tractor has pivoted on opposite sides of its frame near its rear end boom arms A (one only being shown in the side view of Figure 1), which extend forwardly beyond the front end of the tractor and on this front end is mounted a bucket B. Associated with each boom arm A are lever arms 10 and 11 having an inverted V arrangement when the bucket is down in loading position as shown in Figure 1. The two lever arms 10 and 11 are pivotally connected together at one of their ends. The forward lever arm 10 has its front end pivotally connected to the boom arm A on its side at a point near the bucket and the rear lever arm 11 has its rear end pivoted to the tractor frame near the point where the boom arm A on its side is pivoted to the frame. Between the apex connection of each pair of lever arms and the frame is positioned a double acting hydraulic motor M in the form of a cylinder and piston. The cylinder 12 of the motor is pivotally connected at its lower end by a pivot pin 13 to the frame and the piston rod 14 actuated by the piston 15 in the cylinder has its upper end pivotally connected at 14' to the apex connection of the lever arms.

With this overshot loader structure on a tractor as shown, it is believed to be apparent that when the bucket is in down position, as illustrated in Figure 1, the bucket can be loaded by moving the vehicle forwardly. To unload the bucket the motors M are operated which causes the pistons to move upwardly in their cylinders with the result that the boom arms are swung upwardly over the tractor through the particular arrangement and connection of the lever arms 10 and 11. When the boom arms reach substantially vertical position the load in the bucket will be dumped at the rear of the tractor either on the ground or in a truck body if it is desired to haul the material away. The empty bucket is then lowered for reloading. To properly control the bucket by the motor M it is made double acting with both ends on opposite sides of the piston connected to an hydraulic pressure source. A conduit 16 leads to the bottom end of the cylinder and a conduit 17 leads to the top end of the cylinder. A part of conduit 17 comprises a pipe 18 carried on the exterior of the cylinder and extending in parallel relation to the cylinder axis from a point adjacent the cylinder pivot 13 to the top end where it enters the cylinder by a suitable elbow joint as shown. Suitable valve means not shown, controls flow of hydraulic pressure in a selective manner to one end of the cylinder and permits it to be exhausted from the other end, all in a well known manner.

In Figure 2 there are illustrated two conditions of the motor M. In full lines the bucket M is down and in dashed lines the bucket is in dumping position. From these views it is seen that as the bucket is swung over the tractor by the motor the piston moves from the bottom end of the cylinder to the top end and the piston rod becomes extended out of the cylinder and in exposed position. Material being handled may easily drop from the bucket on this exposed piston and cause damage thereto as by pitting, etc. Also, foreign material on the piston rod rapidly wears gaskets or seals, thus necessitating replacements at short intervals, all of which is expensive. To prevent this damage and minimize expense, I have associated with the fluid motor an improved guard construction generally indicated by the letter G.

This guard construction, as best shown in Figures 2 to 5, comprises two elongated plate-like members or sleeves 19 and 20, each being of a width greater than the piston rod and conveniently substantially the same as the diameter of the cylinder and both having a curvature capable of nested relation, as shown, which makes the members trough-like in cross section. The members are arranged to partially surround the cylinder and piston rod and have an overlapping relation. Neither member is as long as the piston rod or the cylinder. The upper member 19 has an angular extension 21 for pivotal connection by a pin 22 with the end of the lever arm 11 close to the point at which it is pivotally connected with the lever arm 10. Thus, as the piston rod and motor swing relatively to the lever arms 10 and 11, the guard will also have like swinging movement. Although the member 19 is pivoted to the lever arm, it could be connected directly to the piston rod at a point exteriorly of the cylinder with the piston rod in retracted position, so that as the rod moves it would also move and become extended with respect to member 20.

The lower end of member 20 is arranged to be mounted for sliding movement on the pipe 18 which leads to the top end of cylinder 12. To this lower end is welded a flange 23 (see Figures 2 and 3) and secured thereto is a bearing 24. The flange has a slot 25 so that it can receive the pipe. The bearing is constructed to be in two half circle pieces for easy mounting around the pipe and these are secured to the flange by suitable bolts 26, all as shown.

To hold the two members in overlapping relation and also assure good sliding movement therebetween, the upper end of member 20 has secured thereto on its opposite edges L-shaped elongated guide elements 27 and 28, all as best shown in Figures 2 and 4. These guide elements provide slots in which opposite marginal portions of the member 19 can slide and yet assure that members 19 and 20 are held in parallel overlapping relation. Besides serving as guides for the member 19 when it moves with the piston rod and becomes extended, these elements 27 and 28 are also employed as part of a means for the member 19 to pick up member 20 and cause both members to be moved with the piston rod after the piston has moved a predetermined distance and because of the length of member 19, such member can no longer by itself cover and guard the piston rod upon additional movement of said rod. To accomplish the pickup operation, the lower end of the member 19 carries two lugs 29 and 30 (see Figures 2 and 4) on its outer surface near its marginal edges to be in line to engage the guide elements 27 and 28 after predetermined sliding of member 19 takes place.

From the foregoing description of details of my improved piston rod guide, shown by way of example as embodying my invention, it is seen that when the hydraulic motor M is retracted in down position of the bucket and the piston rod is retracted inside the cylinder, the guard will be contracted alongside the cylinder into a length approximating the length of the cylinder, all as shown in Figures 1 and 2. When the motor operates and the bucket is swung over the tractor to unloading position, the piston rod is extended out of the cylinder. As this occurs, member 19 moves with it and continues to cover and guard the initial portion of the piston rod as it becomes extended. As the piston reaches about one-half its permissible length of travel in the cylinder during bucket swinging movement, the member 19 will have moved relatively to the member 20 sufficiently to cause member 20 to be picked up and moved therewith. This is accomplished by lugs 29 and 30 engaging guide elements 27 and 28. Both members thereafter move with the piston rod and the member 20 moves out beyond the cylinder to cover and guard the terminal portion of the piston rod that becomes exposed during the final portion of the piston movement in operating the overshot loader bucket.

When the piston is retracted, the member 19 slides down over member 20 until the lower end of member 19 engages flange 23 at the lower end of member 20 and both members then return to the positions shown in Figure 2 where the motor is retracted. In the Figure 2 view showing the motor retracted, the flange 23 and bearing are shown slightly spaced from the lower end of member 19 for purposes of clarity. Generally the end of the member 19 will be engaging the flange unless through vibration, for instance, the bearing 24 slides further down on pipe 18, as until it is stopped by the elbow on the lower end of the pipe.

My guard is compact, easy and cheap to manufacture and operates efficiently. It assures full coverage of the piston rod, yet when the piston rod is returned into the cylinder the guard has less length than the maximum length of the piston rod that is extensible from the cylinder upon a full stroke of the piston of the motor.

I am aware that modifications are possible in the guard structure shown by way of example, all without departing from the fundamental principles of my invention, and therefore the scope of my invention is not to be limited except in accordance with the structural terms and equivalents of the appended claims.

What is claimed is:

1. A guard for a piston rod of a piston and cylinder combination in which piston movement causes the piston rod to be exposed to an increasing extent as it moves out of the cylinder, said guard comprising first and second elongated members each having a width greater than said piston rod and disposed in overlapping relation longitudinally of said cylinder and piston rod; means slidably connecting said first and second members; means movable with said piston rod and connected to the end of said first member remote from said second member, for moving said first member with said piston rod, so that said first member will cover and guard at least the portion of said piston rod exposed during initial movement thereof out of said cylinder; means on said cylinder for supporting the end of said second member remote from said first member for sliding movement relative to said cylinder; and means for moving said second member to a position covering the terminal portion of said piston rod as it moves further out of said cylinder.

2. A guard for a piston rod as defined in claim 1, wherein said cylinder is provided with a pipe extending longitudinally thereof to a position adjacent the end of said cylinder from which said piston rod extends; and wherein said supporting means for said second member is slidable on said pipe.

3. A guard for a piston rod as defined in claim 2, wherein said supporting means for said second member includes a bearing element slidable on said pipe.

4. A guard for a piston rod of a piston and cylinder combination in which piston movement causes the piston rod to be exposed to an increasing extent as it moves out of the cylinder, said guard comprising first and second elongated members each having a width greater than said piston rod and disposed in overlapping relation longitudinally of said cylinder and piston rod; means slidably connecting said first and second members; means movable with said piston rod and connected to the end of said first member remote from said second member, for moving said first member with said piston rod, so that said first member will cover and guard at least the portion of said piston rod exposed during initial movement thereof out of said cylinder; means on said cylinder for supporting the end of said second member remote from said first member for sliding movement relative to said cylinder; and means for moving said second member to a position covering the terminal portion of said piston rod, including cooperating abutments on said first and second members, whereby said first member picks up said second member and moves said second member therewith, after said first member has moved a predetermined distance.

5. A guard for a piston rod as defined in claim 4, wherein said cooperating abutments are respectively disposed at the end of said first member opposite said means movable with said piston rod, and at the end of said second member opposite said supporting means.

6. A guard for a piston rod as defined in claim 5, wherein one of said abutments is formed by said means for slidably connecting said first and second members.

7. A guard for a piston rod of a piston and cylinder combination in which the piston movement causes the piston rod to be exposed to an increasing extent as it moves out of said cylinder, said guard comprising first and second elongated plate-like members disposed in superposed relation; means for mounting said members together for sliding movement relative to each other and to said cylinder; means for connecting said first member for substantially continuous movement with the piston rod so as to cover the initially exposed portion of said piston rod as it moves out of the cylinder, said first member having a shorter length than the maximum distance of movement of the piston rod out of said cylinder; means on said cylinder for supporting said second member for sliding movement; and means interconnecting said second member and said first member for causing said first member to pick up said second member and move it therewith, so that said second member will cover the terminal portion of the piston rod as it moves out of the cylinder a distance greater than the effective covering length of said first member.

8. A guard for a piston rod as defined in claim 7, wherein said elongated members are curved in a manner to partially surround the cylinder and piston rod; and wherein said means for mounting said members together for sliding movement relative to each other includes elements carried by opposed edge portions of one of said members and arranged to extend around the adjacent edge portions of the other of said members to provide guide slots for said adjacent edge portions.

9. In combination with an overshot material loader having connected together lever arms for swinging the bucket over a tractor together with a fluid motor for actuating the lever arms including a pivoted cylinder having a fluid conducting pipe substantially coextensive with its exterior and parallel to its axis, a piston in said cylinder and a piston rod pivotally connected to the connected lever arms, of a guard for covering the piston rod and having one end pivotally connected to the lever arms and its other end slidably mounted on said pipe for relative movement with respect to the cylinder so that as the piston becomes extended out of the cylinder the guard will move therewith and continue to cover the piston and protect it from falling material.

References Cited in the file of this patent

UNITED STATES PATENTS

| | | |
|---|---|---|
| 1,927,078 | Weeks | Sept. 19, 1933 |
| 2,264,560 | Albertson | Dec. 2, 1941 |
| 2,284,661 | Joy | June 2, 1942 |
| 2,512,150 | Geren | June 20, 1950 |
| 2,613,006 | Bradford | Oct. 7, 1952 |
| 2,663,285 | Johnson | Dec. 22, 1953 |